N. GIUSTO.
TIME INDICATING DEVICE.
APPLICATION FILED JUNE 6, 1913.
1,168,797.
Patented Jan. 18, 1916.
3 SHEETS—SHEET 1.
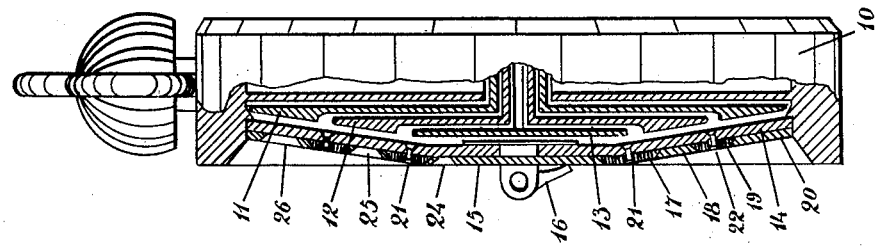
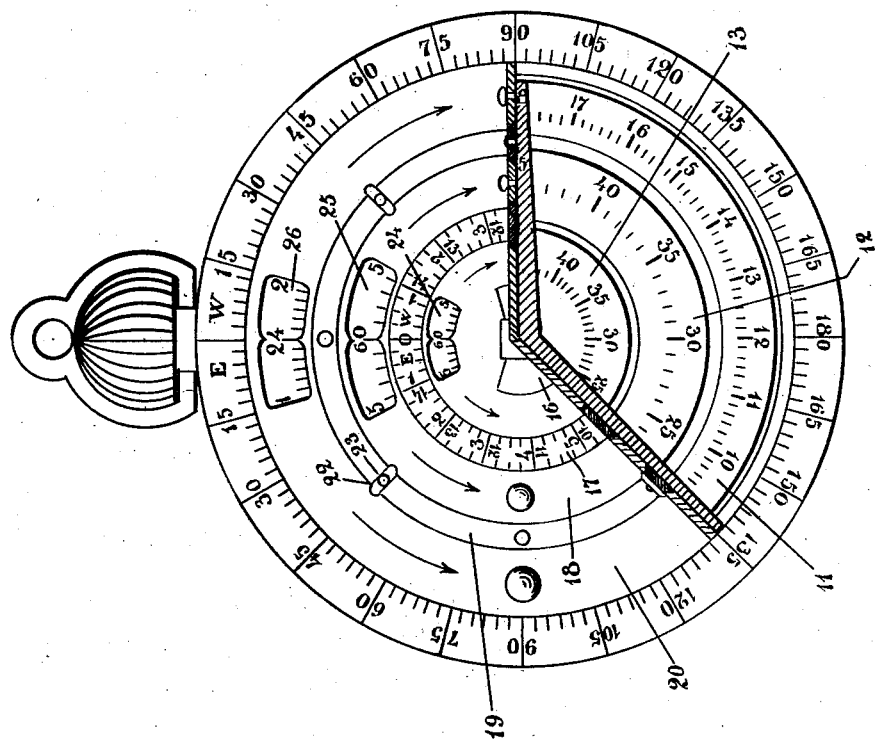
WITNESSES:
INVENTOR
Nicola Giusto
BY
ATTORNEY N. GIUSTO.
TIME INDICATING DEVICE.
APPLICATION FILED JUNE 6, 1913.
1,168,797.
Patented Jan. 18, 1916.
3 SHEETS—SHEET 2.
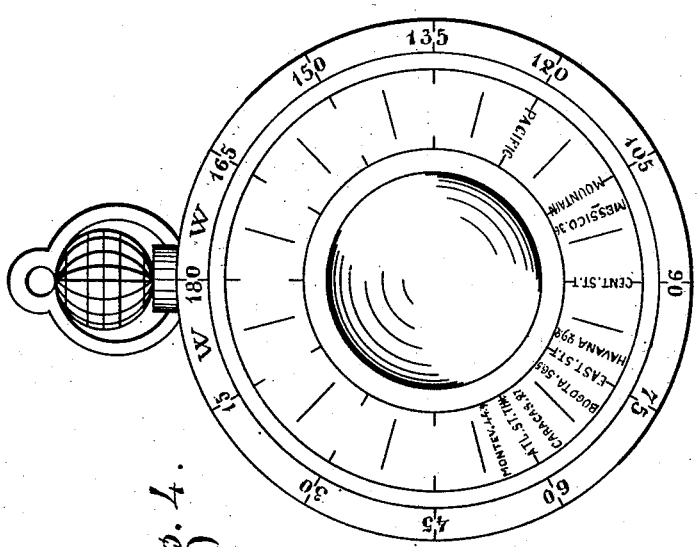
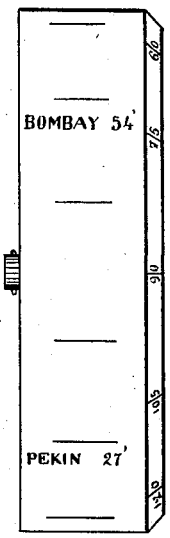
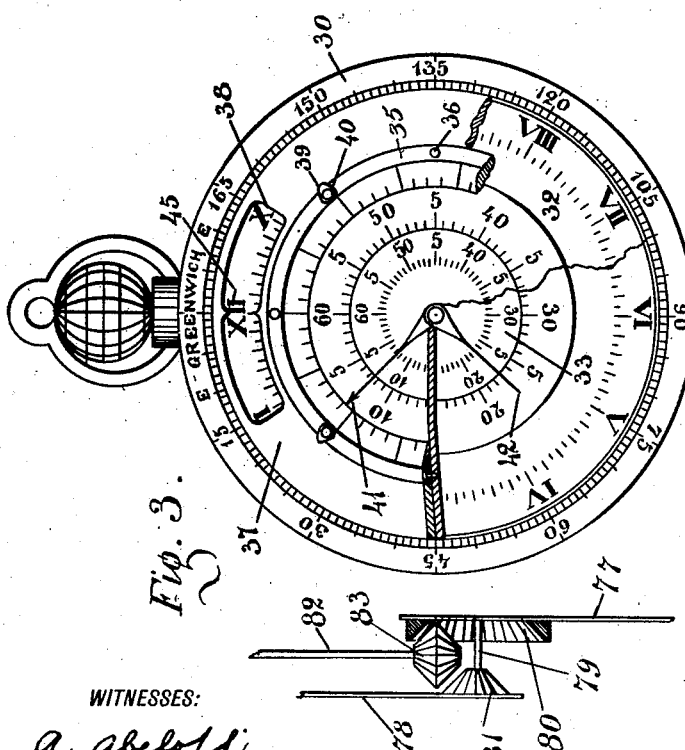
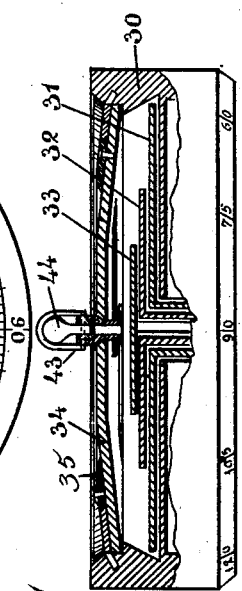
WITNESSES:
INVENTOR
Nicola Giusto
BY
ATTORNEY N. GIUSTO.
TIME INDICATING DEVICE.
APPLICATION FILED JUNE 6, 1913.
1,168,797.
Patented Jan. 18, 1916.
3 SHEETS—SHEET 3.
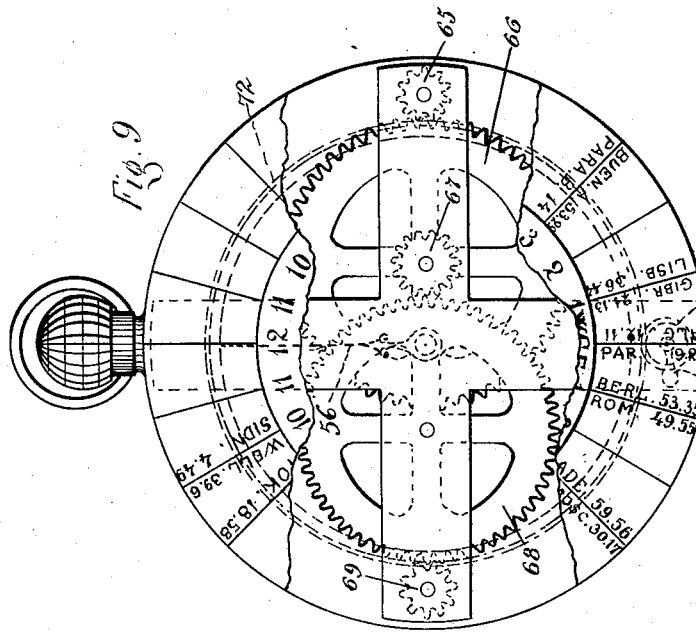
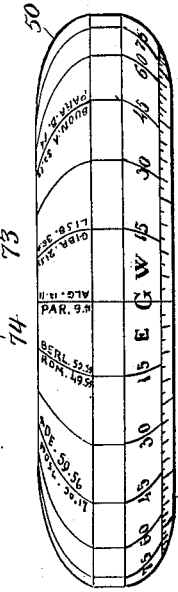
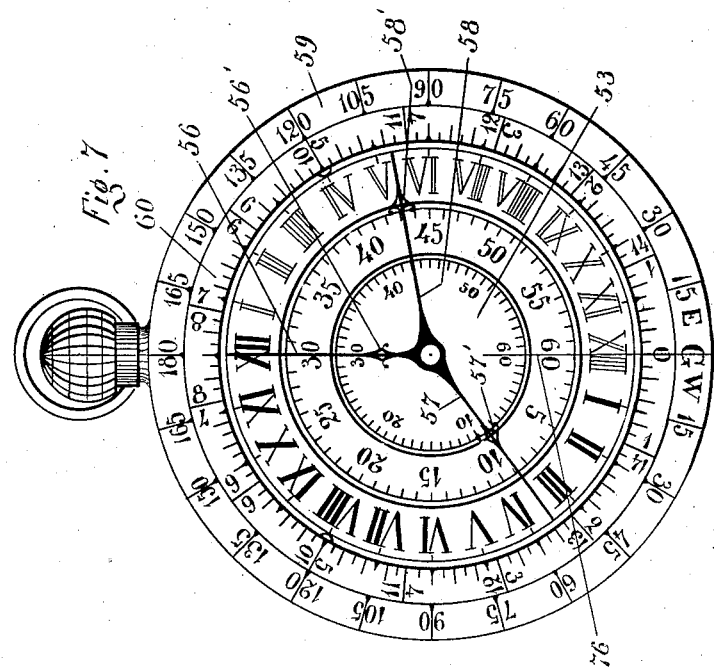
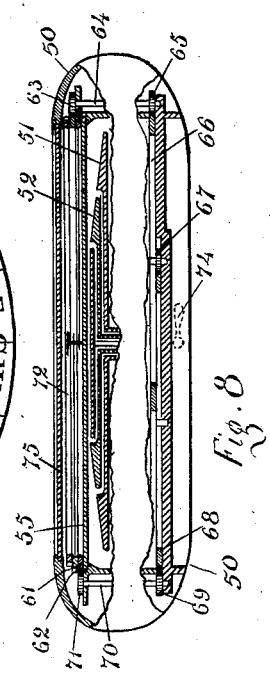
Witnesses
A. Abeloff
L. Rosenfeld
Inventor
Nicola Giusto
By Guido M. Sacerdote
Attorney

UNITED STATES PATENT OFFICE.

NICOLA GIUSTO, OF NEW YORK, N. Y.

TIME-INDICATING DEVICE.

1,168,797.  Specification of Letters Patent.  Patented Jan. 18, 1916.

Continuation of application Serial No. 623,096, filed April 24, 1911. This application filed June 6, 1913. Serial No. 772,129.

*To all whom it may concern:*

Be it known that I, NICOLA GIUSTO, a subject of the King of Italy, residing in the borough of Bronx, in the city, county, and State of New York, have invented certain new and useful Improvements in Time-Indicating Devices, of which the following is a full, clear, and exact description, reference being had to the accompanying drawings, forming a part of this specification.

This invention relates to time indicating devices and particularly to devices of that class which are capable of exactly indicating the standard and local time at any place on earth by means of the operation of easily adjustable parts, there being no necessity of tampering with the clock mechanism; and the present application is a continuation of an application formerly filed by me for universal time indicators, filed April 24, 1911, Serial No. 623,096.

The primary object of this invention is to provide a time indicating device capable of giving time readings at any place on the earth, according to its geographical position, having easily operated means for setting the readings to such geographical position.

A further object of this invention is to provide a time indicating device of a simple construction, capable of giving the above mentioned indications, not requiring a special clock movement, but which can be fitted with standard movements readily found on the market.

A still further object is to provide a universal time indicating device, in which the casing is used for longitude graduations and for indications relating to the geographical position of different localities, said indications being inserted in their proper position in reference to the time belts forming part of said longitude graduation.

With these and other objects in view as will more fully appear as the description proceeds, my invention consists in certain constructions and arrangements of parts as will be hereinafter fully described and claimed in the appended claims.

Referring to the drawings, Figure 1 is a front view partly broken away of a twenty-four hour watch having three reading dials; Fig. 2 is a side view of the same partly sectioned; Fig. 3 is a front view of a twelve hour watch similar in its construction to the watch shown in Fig. 1; Fig. 4 is a rear view of the same; Fig. 5 is a side view partly broken away and Fig. 6 is a side view of the same; Fig. 7 is a front view of a preferred construction of a twenty-four hour watch constructed in accordance with my invention; Fig. 8 is a schematic side sectional view of the same; Fig. 9 is a rear view; and Fig. 10 is a side view of the same showing the indications relating to geographical positions or time of different localities; and Fig. 11 is a detail view in a larger scale of an arrangement for controlling adjustable hands.

My indicating device consists mainly of two parts; a time piece movement of any suitable form having concentric shafts for the hour, minute and second dials, in which the hands have been substituted by revolving dials bearing the time divisions; and a case provided with longitudinal graduations, supplemented by suitable hand operated means for pointing out in a clear and simple manner the different longitude readings at which it is desired to set the watch; indications being also provided on the case, referring to standard times in the twenty-four time belts in which the world is divided, and also referring to differences between local and standard time in the principal localities of the world, when so desired.

The drawings represent my arrangement as applied to pocket watches, but the same can obviously be applied to time pieces of a different character; especial importance being attached to marine chronometers, for which the same is particularly useful, and in which it is essential that the mechanism should never be tampered with.

Figs. 1 and 2 illustrate a twenty-four hour watch, in which 10 is the case, 11, 12 and 13 are respectively the hour, minute and second dials, concentrically moving at suitable different relative speeds, and operated by the watch mechanism (not shown); dial 11 being subdivided in twenty-four segments corresponding to the hours, and making one revolution in one day; dial 12 having sixty divisions corresponding to minutes and making one revolution in one hour; and dial 13 having sixty divisions corresponding to seconds and making one revolution in one minute. 14 is a glass covering the dials, set in the case in any desired manner; on the center of the same is mounted a revoluble disk 15, of a diameter a little smaller than that of the seconds dial 13, which can be turned in both directions, and set in any desired position, by means of a folding knob 16, or in any other suitable manner. Around the same is attached to glass covering 14 an annular guide ring 17, surrounded by a revoluble annular ring 18, of a diameter a little smaller than that of minutes dial 12. This is in its turn surrounded by a guide ring 19, attached to glass covering 14, another annular ring 20, filling the space between ring 19 and the inside face of case 10, and being revoluble therein. Guide rings 17, 19, are attached to the glass covering by means of rivets. Parts 22, pivoted on pins 23 fixed to ring 19, serve to retain in place rings 18, 20; and by turning said parts 22 ninety degrees from the position shown in the drawings, rings 18, 20 can be removed, for the purpose of cleaning the glass. This detail can of course be omitted if desired, and rings 18, 20 be revoluble but permanently retained by guide rings 17, 19. Disks 15 and rings 18, 20 are respectively provided with windows or sights 24, 25, 26, disclosing a section of the dials underneath for the time readings, said windows having a mark at the center to enable the operator to properly set the same according to the different longitudes, as will be hereinafter described. For the longitude readings, I also provide a main graduation and an auxiliary graduation; for the first one I use an annular space on the case around the dials, and for the second one I use guide ring 17, between disk 15 and ring 18. The main graduation is made by time belts, or 15 degrees sections, for 180 degrees in each direction, starting at the top, the starting point being any well recognized standard meridian; each section of 15 degrees corresponds to one hour of difference in time, and being subdivided in six parts, each subdivision corresponds to a ten minutes difference in time. Annular ring 17 is divided in fifteen main sections, numbered in both directions from a starting point at the top, and each section is divided in four subdivisions. In reference to the readings of minutes of time, each main division of ring 17 corresponds to one degree of longitude, and therefore to four minutes in time; each subdivision corresponds consequently to one minute in time. In reference to the readings of seconds of time, the entire circumference corresponding to one minute in time, or to one-fourth of a degree of longitude, each division corresponds to one minute of degree of longitude, and each subdivision corresponds to 15 seconds of degree of longitude or to one second in time. In the arrangements illustrated, it is supposed that the dials 11, 12, 13, revolve in the usual direction to the right; during their movement, the figures will gradually appear in their natural succession, through the sights provided in disk 15, and rings 18, 20; these are shown set to the standard time of the starting meridian. It is obvious that for every fifteen degrees of longitude to the west, the time will become one hour less, while for every fifteen degrees to the east, the time will be one hour more. By moving ring 20 to the right of fifteen degrees, we will read 23 hours instead of 24, and we will have the time of the standard meridian 15 degrees to the west of the starting meridian. In a similar manner, revolving ring 18 to the left of say three main divisions of ring 17, we will have the reading of minutes in time corresponding to a difference of three degrees of longitude to the west, twelve minutes less than the reading shown in the figures. By operating disk 15 we can obtain in an analogous manner the difference of seconds in time, corresponding to differences of longitude with an approximation of fifteen seconds of longitude, or one second in time. Each fifteen degrees graduation on the main longitude dial corresponding to an hour, as stated, when it is desired to set the watch for standard time only, it is not necessary to change the readings of the minute and seconds, as the difference between each standard time is exactly one hour; said readings will have to be adjusted only when, knowing the longitude of a given place it is desired to know the local time at the same.

Figs. 3 to 6 illustrate a watch built on a principle analogous to that just described; with the difference that this is a twelve hour watch, in which the hour dial makes one entire revolution in twelve hours.

Another difference in construction illustrated in said Figs. 3 to 6, is the substitution of revoluble hands in place of disk 15 and ring 18 of the preceding figures. Referring to said drawings, 30 is the case of the watch, 31 is the hour dial, 32 the minute dial, and 33 the second dial; said three dials revolving as before, to the right. 34 is the glass covering, to which an annular ring 35 is fixed by means of rivets 36; a ring 37, provided with a sight 38 is revolubly mounted between ring 35 and the inside of case 30, and is retained in place by parts 39 pivoted on pins 40, attached to ring 35. 41, 42, are two normally stationary hands, pivotally mounted on the center of glass covering 34, operated by means of foldable knobs 43, 44; the same are set respectively to indicate the minutes and seconds of time, according to the graduation of ring 35, which is exactly the same as that of ring 17 in Figs. 1 and 2; the entire circumference corresponding to 15 degrees of longitude for the setting of the minutes hand, and corresponding to fifteen minutes of longitude for the setting of the seconds hand. Hour dial 31 is divided in twelve hours; the front of the case is in the present instance utilized for a graduation of 180 degrees of longitude in one direction, viz. for the hemisphere to the east of the starting meridian (Greenwich); while the graduation for the Western Hemisphere is provided on the rear of the case 30. For instance, 30 degrees east will show the same time as 150 degrees west; with the difference that if at 30 degrees east it is two o'clock p. m., at 150 west it will be two o'clock a. m. The remaining surface of the case, as illustrated in Figs. 3 to 6, is preferably divided in sections corresponding to time belts, comprising seven and a half degrees to the east, and seven and a half degrees to the west of each standard meridian; and the sections corresponding to each time belt are utilized for marking the difference between local time and standard time of the principal cities therein contained, or for giving indications relating to their geographical position. Each time belt section is subdivided in one section corresponding to the eastern part of the belt, and one section corresponding to the western part of the same; and the names of the different cities are marked accordingly. For instance, in the time belt corresponding to eastern standard time, Fig. 4, two notations can be seen; one in the eastern part of the time belt, Bogota 56, 54, and this means that it is noon, local time, at Bogota, when the standard time is 11 hours, 56 minutes and 54 seconds, a. m.; and one in the western part of the belt, Habana, 29, 26, meaning that it is noon, local time, at Habana, when the standard time is 12 hours, 29 minutes, and 26 seconds p. m. Contemporaneous readings of local and standard times can also be had, by providing a mark on the glass, 45, corresponding to the starting meridian, and by setting the readings to the local time; the figures on the dials corresponding to the mark on the glass will give the standard time, while those corresponding to the middle of sight 38 and to hands 41, 42, will give the local time.

In Figs. 7 to 10, I illustrate a preferred form of putting my invention into practice in so far as the graduation of longitude and the arrangement of indicating means are concerned. Said figures refer to a twenty-four hour watch in which the use of the concentric ring, divided in fifteen main sections mounted on the transparent cover is avoided, by means of a special longitude graduation on the case; and of course it will be understood that a similar arrangement may be adopted in connection with a twelve hour watch, without the necessity of any further illustration. In said watch I also show a special arrangement for adjusting the position of the different hands in such a way that the movement of one of the hands is proportional to the movement of another; this is obtained by means of gearings having the proper dimensions. In said drawings, 50 is the case of a watch, and 51, 52, 53, are respectively the hour, minute and second dial, rotating counter-clockwise. There are three adjustable indicating hands, a hand 56 being used for the seconds dial, 57 for the minute dial, and 58 for the hour dial, said hands being made in such a manner as to clearly distinguish one from another. In the hands illustrated in the drawings, said distinction is obtained by providing the arrow portion 56', 57', and 58' of each end in close proximity of the dial that said hand is intended to serve. The main and the auxiliary longitude graduations formerly provided one on the case and the other on an annular concentric ring, are in the present instance provided both on the face of the case, there being a main graduation 59, comprising the 15 degree segments representing the time belts, and an auxiliary graduation 60, which comprises fifteen main divisions, which correspond each to one degree of longitude, said divisions being each subdivided in four main parts, each representing one minute of time. Said auxiliary graduation can be read in one direction or the other, according to the position of the place for which the time has to be read in reference to the starting meridan. The side and the rear portions of the case is also in the present instance utilized for supplying indications relative to the geographical position or to the time in different localities, in order to supply a ready index of the principal informations which are necessary in actual practice, and of course the name and the indications referring to the different localities are inserted in their respective time belts. In the form illustrated in these drawings, the hands are each integral with a toothed ring rotatably mounted on top of a transparent covering 55. The minute hand 57 is integral with a toothed ring 61, and the hour hand is integral with a toothed ring 62; toothed ring 61 can be operated by means of a pinion 63, in mesh with the same, mounted on a shaft 64, on which is also mounted a pinion 65. Said pinion 65 can be operated by hand by opening the back of the case, or in any other suitable manner, and causes toothed ring 62 to rotate at a proportionally reduced speed through gear 66, integral with pinion 67, gear 68 in mesh with said pinion 67, pinion 69 mounted on a shaft 70, and in mesh with said gear 68, and pinion 71 mounted on the same shaft in mesh with toothed ring 62. The seconds hand is integral with a toothed ring 72, in mesh with a pinion 73, which is independently operated by means of a handle or lever 74. It is obvious that when preferred, the hands can also in the present instance be mounted in a way similar to that illustrated in Fig. 5.

75 is a transparent cover for the watch which is preferably supplied with a mark 76, opposite to the standard meridian; said mark will give the standard time in the different localities for the minute and second readings, since it is well known that the readings of standard time for minutes and seconds are the same for all standard times, the difference in time between each standard meridian being exactly one hour. This last described form of embodiment of my invention is possessed of decided advantages over the ones previously described, because its cost of manufacture is lower, the readings are more readily effected, and moreover it is possible to read not only the time of the locality for which the indicating hands are set, but it is also possible to obtain at a glance, the time in that same moment at any of the different localities which are written around each on the back of the case, simply by reading the figures of time on the rotating dials which are opposite to the graduation of longitude corresponding to the geographical position of said localities.

In Fig. 11, I illustrate another way for controlling the hour and minute hands from the outside, the same can be well applied for instance in connection with the watch illustrated in Figs. 3 to 6. In said figures 77 is an adjustable hand, and 78 is another adjustable hand, both pivotally mounted on a pivot 79; hand 77 is provided with an internal conical gear 80, and hand 78 is provided with a conical pinion 81. 82 designates a radially shiftable shaft at the end of which is mounted a double pinion 83, which is shown in mesh with internal gear 80; by shifting shaft 82 downward, pinion 83 will be disengaged from gear 80, and will engage into mesh with pinion 81. It is therefore seen that by rotating shaft 82, either hand 77 or hand 78 can be set to the desired position.

From the foregoing it will be seen that I provide convenient means whereby a perfect adjustment of the indication of time of different localities according to their geographical position, can be effected in a most simple manner; that I furnish means for knowing without calculations the local and the standard time at any point of the earth at any given moment; and moreover that the means for adjusting the different readings are entirely independent from the mechanism of the time piece which needs never be tampered with; this being evidently an advantage over the usual way of setting a watch for the changes in standard time, which are necessary when traveling for considerable distances, or for the changes in local time which are effected when traveling at sea, where the geographical position is taken at noon every day.

It is obvious that where it is desired to produce a time piece only giving indications of standard time, the minutes and seconds indicating hands of the watch illustrated in Fig. 7, can be omitted, since the mark on the glass in correspondence of the standard meridian will be sufficient to answer this purpose. This and various other changes can be made in the construction of the different parts constituting my improved device, without departing from the spirit of my invention; in this connection it may be noted that a cheaper time piece can be constructed without the second dial, where great accuracy is not required; also that the graduations of longitude can be marked directly on the transparent covering, or in other manner different from that shown and described, provided the same remain stationary; therefore I do not wish to confine myself to the shapes and styles shown and described.

I claim:

1. The combination of a watch case, three concentric revolving disk shaped dials bearing respectively the hours, minutes and seconds divisions of time, a main graduation on said case concentric thereto, comprising a number of segments equal to the number of hours on said dial, an auxiliary graduation of longitude comprising fifteen segments and subdivisions of the same, revoluble hand operated means adjustable in reference to said main graduation automatically pointing out the different times on the hour dial according to the different longitudes, and revoluble hand operated means, adjustable in reference to said auxiliary graduation, automatically pointing out the different readings on the minutes and seconds dials, according to the smaller variations of longitude.

2. The combination of a watch case, concentrally revolving disk shaped dials bearing the divisions and subdivisions of time, a main longitude graduation concentric thereto, an auxiliary longitude graduation also concentric thereto bearing the subdivisions of longitude corresponding to an entire revolution of the minutes dial, a transparent disk shaped covering, and hand operated means adjustable in reference to said longitude graduations, automatically pointing out the different times according to the different longitudes.

3. The combination of a plurality of disk shaped revolving dials bearing divisions and subdivisions of time, a watch case bearing a graduation corresponding to divisions and subdvisions of longitude, a disk shaped covering of transparent material, hand operated means adjustable in reference to said graduation of longitude automatically pointing out the different readings of time according to the different longitudes, and a mark on said covering corresponding to the standard meridian of said longitude graduation, pointing out at the same time the standard time of the places of which said adjustable means point out the local time.

4. The combination of a watch case, concentrically revolving disk shaped dials bearing the divisions and subdivisions of time, a main longitude graduation concentric thereto, an auxiliary longitude graduation also concentric thereto bearing the subdivisions of longitude corresponding to an entire revolution of the minute's dial, a disk shaped transparent covering, hand operated means adjustable in reference to said longitude graduations, automatically pointing out the different times according to the different longitudes, and a mark on said covering corresponding to the standard meridian of said longitude graduation, pointing out at the same time on the minute's dial the standard time of the places of which said adjustable means point out the local time.

NICOLA GIUSTO.

Witnesses:
A. ALBELOFF,
L. ROSENFELD.